United States Patent [19]

Hollenberg et al.

[11] 3,966,855

[45] June 29, 1976

[54] METHOD OF FABRICATING SILICON CARBIDE ARTICLES

[75] Inventors: Glenn W. Hollenberg; Robert L. Crane, both of Dayton, Ohio

[73] Assignee: The United States of America as represented by the Secretary of the Air Force, Washington, D.C.

[22] Filed: Feb. 22, 1974

[21] Appl. No.: 445,046

[52] U.S. Cl. .................................. 264/65; 106/44; 264/66; 264/332
[51] Int. Cl.² ......................................... C04B 35/52
[58] Field of Search ...................... 264/65, 66, 332; 106/44

[56] References Cited
UNITED STATES PATENTS

| | | | |
|---|---|---|---|
| 2,938,807 | 5/1960 | Andersen | 106/44 |
| 3,275,722 | 9/1966 | Popper | 106/44 |
| 3,442,989 | 5/1969 | Hildebrandt | 264/63 |

OTHER PUBLICATIONS

Alliegro et al., "Pressure–Sintered Silicon Carbide," J. Am. Cer., Soc., 39 [11] pp. 386–389.

*Primary Examiner*—Donald J. Arnold
*Assistant Examiner*—John Parrish
*Attorney, Agent, or Firm*—Joseph E. Rusz; Cedric H. Kuhn

[57] ABSTRACT

A method is provided for fabricating silicon carbide articles which comprises hot pressing a homogeneous mixture of carbonaceous particles and silicon carbide powder. The presence of the carbon limits grain growth so that a silicon carbide product having greatly improved physical properties is obtained. The method is suitable for fabricating structural elements, e.g., structural components in the hot sections of air breathing propulsion systems.

11 Claims, 3 Drawing Figures

METHOD OF FABRICATING SILICON CARBIDE ARTICLES

RIGHTS OF THE GOVERNMENT

The invention described herein may be manufactured and used by or for the Government of the United States for all governmental purposes without the payment of any royalty.

FIELD OF THE INVENTION

This invention relates to a method of fabricating silicon carbide articles. In one aspect it relates to a method of inhibiting grain growth during the hot pressing or pressure sintering of silicon carbide powder.

BACKGROUND OF THE INVENTION

Particulate silicon carbide is extensively used in abrasive and refractory applications. However, its use in the manufacture of structural elements by pressure sintering has not in all cases proven to be entirely satisfactory. One difficulty in the fabrication and use of high density, polycrystalline silicon carbide is that large grains are formed that reduce the strength to impractical levels. As a result conventional hot pressing of silicon carbide powder is incapable of producing structural components which must possess high strength and impact resistance, such as those found in the hot sections of air breathing propulsion systems.

It is an object of this invention, therefore, to provide a method of limiting grain growth during the fabrication of high density, polycrystalline silicon carbide articles.

Another object of the invention is to provide a method of fabricating silicon carbide articles which possess outstanding mechanical properties.

A further object of the invention is to provide an improved hot pressing method for forming silicon carbide structural components.

Other objects and advantages of the invention will become apparent to those skilled in the art upon consideration of the accompanying disclosure and the drawing, in which.

SUMMARY OF THE INVENTION

Figure 1:
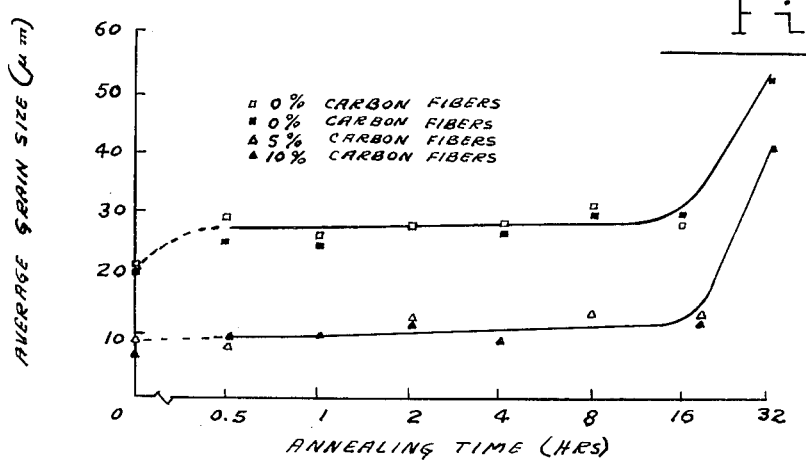
FIG. 1 illustrates graphically the relationship between average grain size of SiC bodies and annealing time at 2150°C.

Broadly speaking, the present invention resides in the discovery that in the fabrication of silicon carbide articles the addition of carbon to silicon carbide powder prior to hot pressing reduces the rate of grain growth so that articles are produced that have greatly improved physical properties. As a result of this discovery, silicon carbide can now be employed in many applications requiring high mechanical properties in a high temperature environment, such as in the fabrication of turbine inlet temperature sensors, rocket nozzle liners, turbine vanes, and anti-pollution afterburners for internal combustion engines.

In one embodiment, the method of this invention comprises the steps of compressing a mixture consisting essentially of silicon carbide powder and particulate carbon under a vacuum or in an inert atmosphere at an elevated pressure in a compression zone formed of graphite and lined with a sheet of graphite while heating the zone at an elevated temperature; and continuing the compression step until a compacted article is obtained that has a density substantially equal to the theoretical density of silicon carbide. The theoretical density of silicon carbide is about 3.2 gm/cc.

In a preferred embodiment, the compression step is carried out in two stages, and a densification aid is included in the mixture of particulate carbon and silicon carbide powder. During the first stage the mixture is heated at a relatively low temperature and pressure to allow outgassing of the mixture. Thereafter, the temperature and pressure are increased within as short a time as possible to the optimum conditions for accomplishing the desired densification.

The silicon carbide employed in the method is preferably of very high purity, e.g., greater than 98 weight percent, silicon carbide. The material is in the form of a powder having a very small particle size, e.g., from about 0.005 to 30, preferably from 0.005 to 15, microns.

The carbonaceous material used in the method can, in general, be any material having a high carbon content, particularly amorphous and graphitic carbons. Examples of suitable carbonaceous materials include carbon fibers, graphite fibers, carbon black, graphite powder and the like. The carbon in admixture with the silicon carbide is in finely divided form, preferably having a particle size on the same order of the size of the silicon carbide powder. In the case of carbon and graphite fibers, the fibers preferably have a diameter about equal to the diameter of the particles of silicon carbide. Insofar as the silicon carbide is concerned, the carbon is inert. The amount of carbonaceous material contained in the mixture is in the range of about 0.75 to 20, preferably 5 to 15, weight percent, based upon the weight of the silicon carbide.

While it is not a necessary component of the mixture that is compressed, because of superior results obtained it is usually preferred to include a densification agent. As the name implies, the agent aids in the hot pressing or densification of the silicon carbide. Examples of materials which can be used include aluminum, alumina and boron, with the latter material being preferred. Like the other components in the mixture, the agent is in finely divided form. While the size of the particles usually ranges from 1 to 20 microns, it is preferred to employ particles that are as fine as possible, e.g., particles of submicron size. The amount of the agent added to the mixture generally falls in the range of about 1 to 5 weight percent, based upon the weight of the silicon carbide.

Prior to the hot pressing step, the ingredients are mixed so as to form a homogeneous mixture. In a preferred procedure, the silicon carbide powder, the carbonaceous material and the densification agent, when used, are initially mixed in a blender or other suitable mixing device. When carbon or graphite fibers or filaments are utilized, they are chopped into short segments (about 0.25 inch or shorter in length) prior to addition to the blender. Furthermore, in the case of fibers or filaments, use of a mixer with cutting blades results in the cutting of the segments into shorter lengths. In this initial mixing step, which may last for a period of about 5 to 30 minutes, the fiber segments are usually reduced to an aspect ratio of about 10 to 1, e.g., a diameter of 7 microns and a length of 70 microns.

Upon completion of the initial mixing step, the mixture is then subjected to a second mixing step. In a preferred procedure, the mixture is ball milled in a liquid mixing medium which is inert to the ingredients. Examples of liquid that can be used include alcohols, such as methanol, ethanol, propanol and butanol; ketones, such as acetone and methyl ethyl ketone; and hydrocarbons, such as benzene. The wet milling is continued until the ingredients are completely dispersed. The milling time can vary within rather wide limits and will depend to a large extent upon the amount of the mixture and the type of milling equipment. In general, the milling time falls in the range of 1 to 24 hours with a period of about 6 to 10 hours being usually sufficient. At the end of the milling period, the mixture, which, depending upon the amount of mixing medium used, may be of paste-like consistency, is dried, thereby providing a dry homogeneous mixture of the ingredients. The drying of the mixture is advantageously carried out in a vacuum oven maintained at slightly above the boiling point of the mixing medium. However, drying can be accomplished merely by allowing the mixture to stand at room temperature for a period of time sufficient for the medium to evaporate.

After the wet milling operation, the homogeneous mixture or a desired measured portion thereof is compressed under a vacuum or in an inert atmosphere at a temperature in the range of about 1950° to 2250°C and a pressure of about 4000 to 6000 psi for a period of about 10 to 20 minutes. A vacuum of $10^{-3}$ torr or better, e.g., $10^{-5}$ torr, has been found to be desirable. While it is preferred to carry out the hot pressing under a vacuum, it can be conducted under a blanket of an inert gas, such as argon, helium or nitrogen. A conventional hot pressing die made from a graphite having a low coefficient of thermal expansion can be employed. The die or mold is advantageously heated by induction in accordance with procedures well knwon in the art. The graphite die is lined with a thin sheet of graphite which is non-reactive with the mixture and functions as a die lubricant.

In a preferred procedure, the compression step is conducted in two stages. During the first stage, the homogeneous mixture in the die or mold is compressed under a vacuum or in an inert atmosphere, as indicated above, at a temperature between about 700° and 1200°C and under a pressure of about 400 to 600 psi for a period of about 15 minutes to 1 hour. As a result of this step, outgassing of the mixture occurs. Thereafter in the second stage, the temperature is raised in as short a time as possible, e.g., in about 15 to 45 minutes, to between about 1950° and 2250°C which is maintained for a period of from about 10 to 20 minutes. During this period the mixture is under a pressure of about 4000 to 6000 psi. To state the time period in another manner, the compressed article is held under the aforementioned temperature and pressure conditions until the slump rate obtained is less than 1 mil/in-min.

At the end of the compression step, the die or mold is allowed to cool to room temperature over a period of about 1 to 4 hours. When the die is heated by induction, this cooling is accomplished by reducing the power to zero over a 15 to 30 minutes time span. Thereafter, the molded article is removed from the die. Because of the method followed in fabricating the article, the grain growth of the polycrystalline silicon carbide is limited, i.e., discontinuous grain growth (growth of large grains) is inhibited. As a result the article has improved mechanical properties, a condition rendering it suitable for use in forming structural components that may be exposed to high temperature conditions.

A more comprehensive understanding of the invention can be obtained by referring to the following illustrative example which is not intended, however, to be unduly limitative of the invention.

EXAMPLE

A series of runs was conducted in which articles in the form of billets were prepared in accordance with the method of this invention. Control runs were also carried out in which a carbonaceous material was not included in the mixture from which billets were fabricated.

In the runs of the invention, mixtures of silicon carbide powder, carbon fibers and, in most instances, boron powder were used. The silicon carbide powder had an average particle size of 7 microns and a purity of 99 weight percent. The boron powder had a maximum particle size of 5 microns. The cabon fibers used were Thornel 50 fibers of Union Carbide Corp. In their virgin state the fibers have an average strength and modulus of 300 ksi and $50 \times 10^6$ psi respectively. Prior to use, the fibers were chopped into one-quarter inch lengths.

Mixtures containing various amounts of the aforementioned ingredients, and in some cases omitting either the carbon fibers or boron, were prepared according to the procedure described hereinafter. Initially, the materials were mixed in a Waring blender for a period of about .3 minutes. Thereafter, the blended materials were wet milled by placing the materials in a polyethylene bottle containing acetone and two alumina balls. The bottle was then placed on a roll mill, and the bottle was revolved for 6 hours. After the milling, it was noted that the fibers had been reduced to an aspect ratio of about 10 to 1. Upon completion of the wet milling operation, the mixtures were dried in a vacuum oven at about 60°C, thereby providing dry, homogeneous mixtures.

Batches of 150 grams of the mixtures were next hot pressed, thereby producing substantially theoretically dense billets which were 2.5 inches in diameter and 0.75 inch high. The procedure followed in this operation was to pour the powder into a conventional hot pressing die (2 inch I.D. × 4 inch O.D. × 4½ inches long) made from ATJ graphite (Union Carbide Corp.) and lined with a sheet of graphite having a thickness of about 25 mils (Grafoil flexible graphite — Union Carbide Corp.). This assembly with a plunger in place was then positioned in a Vacuum Industries 15 kw hot press wherein the mixture was subjected to a pressure of 500 psi and heated under a vacuum of $10^{-3}$ torr at 1000°C for a period of 30 minutes. Thereafter, maximum power was applied to bring the assembly to a temperature between 1950° and 2250°C when a pressure of 5000 psi was applied. After the desired temperature was reached, the power was decreased to maintain that temperature. These temperature and pressure conditions were maintained until less than 1 mil/in-min slump rate was observed which generally took from 10 to 20 minutes. The assembly was then allowed to cool to room temperature by reducing the power to zero over a period of 20 minutes. The assembly was then removed from the vacuum hot press and the silicon billet was recovered from the die.

The silicon carbide billets were initially characterized by measuring their densities by the standard Archimedes method. In general, the densities of the billets fabricated according to the present invention were at least 98.5 percent of theoretical. X-ray diffraction analysis identified both the starting SiC powder and the hot pressed billets as α SiC, type 6H. Although graphite was also noted, no boron-containing compounds were found.

Tests were conducted to determine the effect of carbon fiber additions on the grain growth of SiC. The specimens used, which measured 0.25 inch × 0.25 inch × 0.5 inch, were cut from billets prepared as described above and containing 3 weight percent boron and different amounts of carbon fibers. The specimens were annealed with a graphite resistance furnace in a purified argon atmospheres. Temperatures were measured and held to a precision of ± 10°C with a calibrated optical pyrometer. After annealing, individual specimens were ground on progressively finer diamond impregnated laps, with the final polishing step being performed on a 1 micron lap. After being thermally etched at 1600°C for 15 minutes in vacuo, the average grain size was determined with the linear intercept method [Mendleson, J. Amer. Ceram. Soc., 52, 442 (1968)].

Data obtained in the tests described in the preceding paragraph are shown graphically in FIG. 1. As seen from the graph, at an annealing temperature of 2150°C an average grain size of about 10 microns was maintained for as long as 16 hours for specimens containing 5 and 10 weight percent carbon fibers. On the other hand, specimens with no carbon fibers or only 1 weight percent grew in a matter of 1 hour to a stabilized grain size of about 30 microns. It is this first period of growth (or no growth) which determines the strength of the hot pressed silicon carbide article.

Tests were conducted to determine the effect of carbon fiber additions on mechanical properties of silicon carbide specimens. The specimens measuring 0.1 inch × 0.2 inch × 2 inches were cut from billets prepared as described above and ranging in composition from 0 to 30 weight percent fibers and containing 0, 1, or 5 weight percent boron. All specimens were tested in four point bending on an Instron testing machine at a crosshead speed of 0.005 in/min. The load was applied by hardened steel pins 0.8 inch apart while the bars were supported by pins 1.6 inches apart. At least four specimens were tested for each composition.

Figure 2:
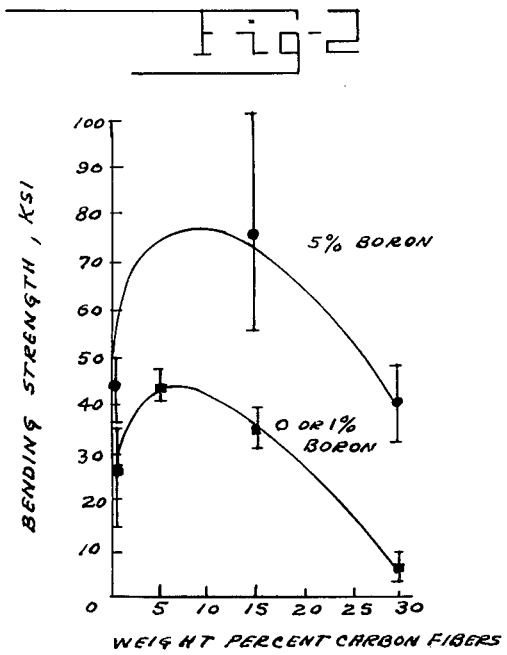
FIG. 2 illustrates graphically the relationship between four-point bend strength of SiC bodies and carbon fiber content.

Data obtained in the tests described in the preceding paragraph are shown graphically in FIG. 2. Thus, the curves show the strength of silicon carbide as a function of carbon fiber content at three different boron levels. The vertical bars represent the range of values observed during tests at a particular composition. As seen from the curves, the strength of the 0 and 1 weight percent boron specimens increased to a maximum between 5 and 10 weight percent carbon contents. Specimens containing 5 weight percent boron had a greater strength, with the strength increasing to a maximum between about 5 and 15 weight percent carbon content. These are the ranges of composition in which optimum limitation of grain growth occurred during hot pressing. Examination of the 0, 5, 15 and 30 weight percent fiber specimens revealed average grain diameters of 23, 9, 7 and 7 microns, respectively. However, since there is a substantial decrease in the strength of specimens containing greater than 20 weight percent carbon, this is about the upper limit of carbon content that provides the greatest improvement in strength for the silicon carbide articles.

Figure 3:
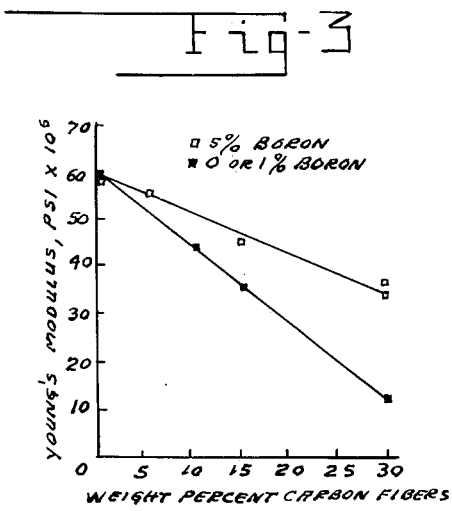
FIG. 3 illustrates graphically the relationship between Young's modulus of elasticity of SiC bodies and carbon fiber content.

The Young's modulus of elasticity of specimens tested as described above is shown graphically in FIG. 3. As seen from the figure, the modulus of SiC decreased linearly with carbon content. Lowering of the modulus is desirable effect, but it is usually undesirable to have a carbon content greater than 20 weight percent because of the decrease in strength that occurs at greater carbon contents. Thus, where it is desired to have a product with the greatest possible strength and lowest modulus, it is necessary to effect a compromise as between these properties so as to obtain a product most suitable for the particular application.

As will be evident to those skilled in the art, modifications of the present invention can be made in view of the foregoing disclosure that fall within the spirit and scope of the invention.

We claim:

1. A method of fabricating an article of α silicon carbide which comprises compressing a homogeneous mixture consisting essentially of α silicon carbide powder and about 0.75 to 20 weight percent of finely divided carbon particles, based upon the weight of silicon carbide, at an elevated temperature in the range of about 1950° to 2250°C, a pressure ranging from about 4000 to 6000 psi and under a vacuum or in an inert atmosphere in a compression zone formed of graphite and lined with a sheet of graphite; and continuing the compression step until there is otained an article of α silicon carbide having a density substantially equal to the theoretical density of silicon carbide.

2. The method according to claim 1 in which the mixture consists essentially of α silicon carbide powder, about 0.75 to 20 weight percent of finely divided carbon powder and about 1 to 5 weight percent of densification agent selected from the group consisting of aluminum, alumina and boron, both weight percentages being based upon the weight of the silicon carbide powder.

3. The method according to claim 2 in which the mixture is compressed at a temperature in the range of about 1950° to 2250°C and at a pressure ranging from about 4000 to 6000 psi for a period of about 10 to 20 minutes.

4. The method according to claim 5 in which the mixture is compressed under a vacuum of about $10^{-5}$ to $10^{-3}$ torr.

5. The method according to claim 2 in which the mixture is initially compressed at a tempeature ranging from about 700° to 1200°C and at a pressure ranging from about 400 to 600 psi for a period of about 15 minutes to 1 hour; the resulting compacted article is compressed at a temperature in the range of about 1950° to 2250°C and at a pressure ranging from about 4000 to 6000 psi for a period of about 10 to 20 minutes; the compression zone is cooled to room temperature over a period of about 1 to 4 hours; and the silicon carbide article is recovered from the compression zone.

6. The method according to claim 5 in which the mixture is compressed under a vacuum of about $10^{-5}$ to $10^{-3}$ torr.

7. The method according to claim 5 in which the mixture consists essentially of silicon carbide powder; finely divided carbon particles selected from the group consisting of chopped carbon fibers, chopped graphite fibers, carbon black and graphite powder; and boron.

8. In a method of fabricating an article from silicon carbide powder by hot pressing, the improvement which comprises adding particulate carbon to the silicon carbide powder prior to hot pressing so as to inhibit grain growth during hot pressing.

9. The method according to claim 8 in which 5 to 15 weight percent particulate carbon, based upon the weight of silicon carbide powder, is added; the particulate carbon and silicon carbide powder are blended; the resulting blend is ball milled in a medium selected from the group consisting of an alcohol, a ketone and a hydrocarbon; and the milled material is dried so as to remove the medium and thereby provide a homogeneous mixture consisting essentially of silicon carbide powder and particulate carbon.

10. A method of fabricating an article of silicon carbide which comprises the following steps:
   a. blending $\alpha$ silicon carbide powder with about 0.75 to 20 weight percent of finely divided carbon particles, based upon the weight of the silicon carbide, so as to form a homogeneous mixture consisting essentially of the aforementioned ingredients;
   b. milling the homogeneous mixture of step (a) in a liquid mixing medium which is inert to the ingredients of the mixture until the ingredients are completely dispersed;
   c. drying the mixture of step (b) so as to evaporate the mixing medium;
   d. initially compressing the dried mixture of step (c) in a compression zone formed of graphite and lined with a sheet of graphite at a temperature in the range of about 700° to 1200°C and at a pressure ranging from about 400 to 600 psi, the compressing being carried out under a vacuum of about $10^{-5}$ to $10^{-3}$ torr or under a blanket of an inert gas for a period of about 15 minutes to 1 hour;
   e. compressing the resulting compacted article in the compression zone at a temperature in the range of about 1950° to 2250°C and at a pressure ranging from about 4000 to 6000 psi for a period of about 10 to 20 minutes, the compressing being carried out under a vacuum of about $10^{-5}$ to $10^{-3}$ torr or under a blanket of an inert gas for a period of about 10 to 20 minutes;
   f. allowing the compression zone to cool to room temperature over a period of about 1 to 4 hours; and
   g. recovering the silicon carbide article from the compression zone.

11. The method according to claim 10 in which the $\alpha$ silicon carbide in step (a) is blended with about 0.75 to 20 weight percent of finely divided carbon particles and about 1 to 5 weight percent of a densification agent selected from the group consisting of aluminum, alumina and boron, both weight percentages being based upon the weight of the silicon carbide powder, so as to form a homogeneous mixture consisting essentially of the aforementioned ingredients.

* * * * *